(12) United States Patent
Valtin et al.

(10) Patent No.: US 6,243,107 B1
(45) Date of Patent: Jun. 5, 2001

(54) OPTIMIZATION OF A GRAPHICS PROCESSOR SYSTEM WHEN RENDERING IMAGES

(75) Inventors: Peter Bingham Valtin, San Francisco; Donald Wayne Mullis, Mountain View, both of CA (US)

(73) Assignee: 3D Labs Inc., Ltd., Hamilton (BM)

( * ) Notice: Subject to any disclaimer, the term of this patent is extended or adjusted under 35 U.S.C. 154(b) by 0 days.

(21) Appl. No.: 09/131,562

(22) Filed: Aug. 10, 1998

(51) Int. Cl.[7] .............................. G06T 1/20; G06F 15/80
(52) U.S. Cl. .......................... 345/506; 345/505; 709/107
(58) Field of Search ............................ 345/504; 709/201, 709/105, 106, 107, 108, 208, 203, 207

(56) References Cited

U.S. PATENT DOCUMENTS

| | | | |
|---|---|---|---|
| 4,543,626 | * 9/1985 | Bean et al. | 709/201 |
| 4,953,078 | 8/1990 | Petit | 712/248 |
| 5,349,682 | * 9/1994 | Rosenberry | 709/102 |
| 5,388,262 | * 2/1995 | Hillis | 712/204 |
| 5,535,387 | 7/1996 | Matsuoka | 709/105 |
| 5,692,192 | 11/1997 | Sudo | 708/105 |
| 5,818,469 | * 10/1998 | Lawless et al. | 345/522 |
| 5,828,880 | * 10/1998 | Hanko | 709/106 |
| 5,861,893 | * 1/1999 | Sturgess | 345/525 |
| 5,898,855 | * 4/1999 | Onodera et al. | 709/1 |
| 5,951,672 | * 9/1999 | Kwok et al. | 712/28 |
| 5,956,495 | * 9/1999 | Kahle et al. | 703/26 |
| 6,078,339 | * 6/2000 | Meinerth et al. | 345/522 |
| 6,088,044 | * 7/2000 | Kwok et al. | 345/505 |

* cited by examiner

Primary Examiner—Ulka J. Chauhan
(74) Attorney, Agent, or Firm—Sawyer Law Group LLP

(57) ABSTRACT

A method and system for optimizing the performance of a graphics processor system is disclosed. The graphics processor system includes multiple CPUs. The system has at least one application thread or master thread, and in addition each CPU is assigned a slave thread. In a first aspect, the method and system comprises assigning each slave to a particular CPU and causing the master thread to move between the processors to cause each slave thread to execute its graphics pipeline. This minimizes data motion due to application inputs being transferred from CPU to CPU. The method and system further includes providing a summary of relevant changes to graphics state to each slave, thus guaranteeing correct state without requiring synchronization around state updates. Accordingly a system and method in accordance with the present invention minimizes data motion during input and also minimizes synchronization associated therewith in a graphics processor system. In a second aspect, the method and system comprises incorporating within each slave thread the entire graphics computation pipeline. Consequently no intermediate outputs are transferred from CPU to CPU, thus minimizing output data motion. The method and system further provides separately addressable output buffers for each slave for communication with the hardware. These output buffers are processed by the hardware in an order corresponding to the original order of inputs. Thus correct serial output is guaranteed with minimal synchronization between threads. Accordingly, a system and method in accordance with the present invention minimizes output data motion and also minimizes synchronization associated therewith in a graphics processor system.

19 Claims, 5 Drawing Sheets

OPTIMIZATION OF A GRAPHICS PROCESSOR SYSTEM WHEN RENDERING IMAGES

FIELD OF THE INVENTION

The present invention relates generally to graphics processor systems and more particularly to optimizing geometry processing and the rendering of images of such processor systems.

BACKGROUND OF THE INVENTION

The tasks of traditional geometric graphics applications can be partitioned into three functional categories: structure traversal, geometry processing, and rendering. Structure traversal refers to the traversal of an application's graphics data structure, either by the application or by a graphics library.

Geometry processing refers to floating point intensive operations, such as vertex transformation and shading, that convert the image data from an applications format into a geometric format of vertices comprising the image and vertex properties, such as color. Finally, rendering refers to the process of calculating individual pixel values for the image that are stored in graphics memory based on the transformed geometric data.

Graphics processor architectures often include multiple processors or central processing units (CPUs). The individual CPUs can be similar or they can be different from each other based upon the application. However, graphics systems that have attempted to use multiple CPUs have had significant overhead due to data motion and synchronization issues. Such multiprocessor systems typically have included at least two CPUs, one or more slave threads, and at least one application thread, sometimes referred to as the master thread. In addition, each of the CPUs typically has a CPU cache. Graphics processor software typically is implemented as a sequential series of computational stages, called the graphics pipeline. Multiprocessor graphics systems could operate by assigning certain floating point pipeline stages to certain CPUs.

For example, the floating point pipeline stages might be an application stage, a geometry transform stage, a lighting stage, a texturing stage, and then several other stages before displaying on the hardware, or before the data is output to the hardware. Using this assignment system, one CPU may execute a first group of stages, and then another CPU might execute the remaining stages.

This type of assignment system fails for two reasons. The first reason is that data must be moved from one CPU to another across stage boundaries. This is a problem because hardware mechanisms for communicating between CPUs are typically very complex. They are so complex that typically both CPUs must be stalled until all the data is transferred from one CPU to the other. The second problem is that the CPUs have to be synchronized. Once again, this requires stalling the CPUs to assure that the data that is being provided is clearly synchronized from one CPU to the next. In such a system, there is the ability to rearrange the pipeline; however, the above-identified problems will still occur.

Accordingly, what is needed is a system and method in a multiprocessor graphics environment that minimizes data motion between CPUs and also minimizes overhead created by synchronization. The system should be easy to implement, should be cost effective, and should not require significant modification of existing graphics processor systems. The present invention addresses such a need.

SUMMARY OF THE INVENTION

A method and system for optimizing the performance of a graphics processor system is disclosed. The graphics processor system includes multiple CPUs. The system has at least one application thread, and in addition each CPU is assigned a slave thread. In a first aspect, the method and system comprises assigning each slave to a particular CPU and causing the master thread to move between the processors to cause each slave thread to execute its graphics pipeline. This minimizes data motion due to application inputs being transferred from CPU to CPU. The method and system further includes providing a summary of relevant changes to graphics state to each slave, thus guaranteeing correct state without requiring synchronization around state updates.

Accordingly a system and method in accordance with the present invention minimizes data motion during input and also minimizes synchronization associated therewith in a graphics processor system. In a second aspect, the method and system comprises incorporating within each slave thread the entire graphics computation pipeline. Consequently no intermediate outputs are transferred from CPU to CPU, thus minimizing output data motion.

The method and system further provides separately addressable output buffers for each slave for communication with the hardware. These output buffers are processed by the hardware in an order corresponding to the original order of inputs. Thus correct serial output is guaranteed with minimal synchronization between threads. Accordingly, a system and method in accordance with the present invention minimizes output data motion and also minimizes synchronization associated therewith in a graphics processor system. These features in both aspects enhance the performance of a graphics processor system.

DETAILED DESCRIPTION OF THE INVENTION

The present invention is directed toward a method and system for optimizing a graphics processor system in particular geometry processing and rendering an image. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. For example, although the present invention is described in the context of optimizing the performance of a graphics processor system, one of ordinary skill in the art readily recognizes that the present invention could be used for optimizing the computation of any type of multiprocessor system. Thus, the present invention is not intended to be limited to the embodiment shown but is to be accorded the widest scope consistent with the principles and features described herein.

Figure 1:
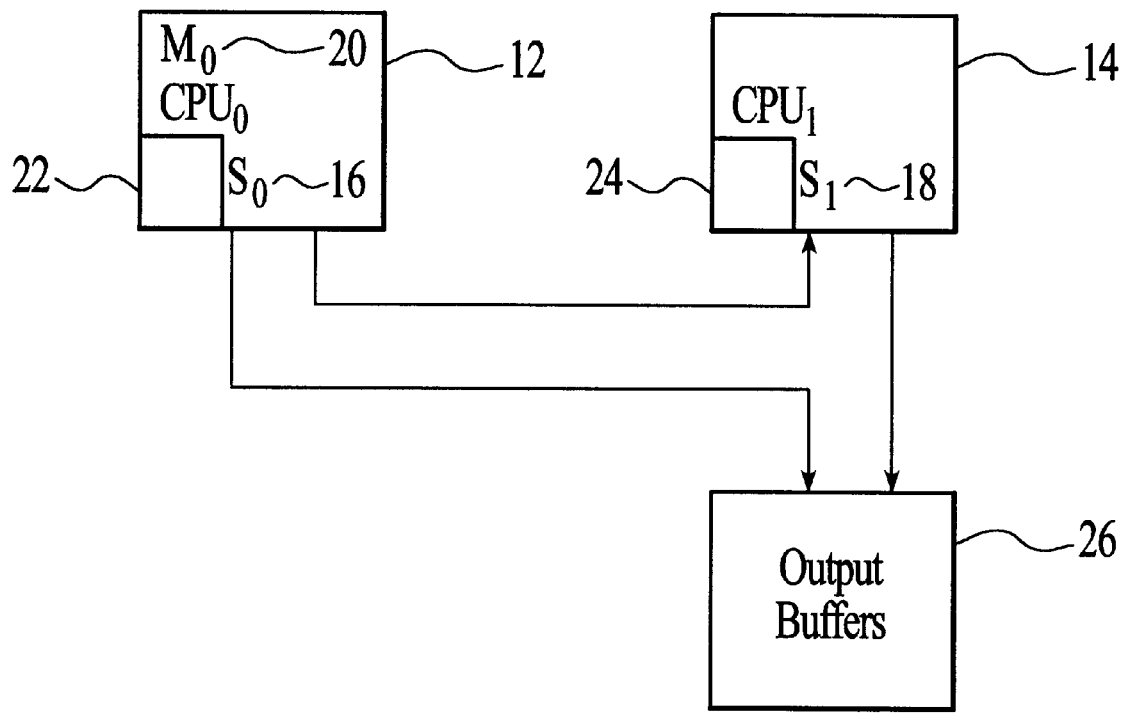
FIG. 1 is a block diagram of a multiprocessing system for rendering images.

FIG. 1 is a block diagram of a multiprocessor graphics system 10. As is seen, the multiprocessor system includes a plurality of CPUs, in this case two, CPU 12 and CPU 14. CPU 12 includes a slave thread 16, and CPU cache 22, CPU 14 includes a CPU cache 24 and a slave thread 18. As is also seen, CPU 12 also includes a master thread 20. In addition, it is known that when one thread is working on a CPU, no other thread can work.

The master thread's 18 function is typically to execute the application which generates the data for the slave threads 16 and 18 to render the ultimate images. As is seen, in both CPU 12 and the CPU 14, the slave threads 16 and 18 execute data which is then ultimately sent to a hardware mechanism 26 which will either display the computed pixels values or render the subsequent image and display the rendered pixels.

Figure 2:
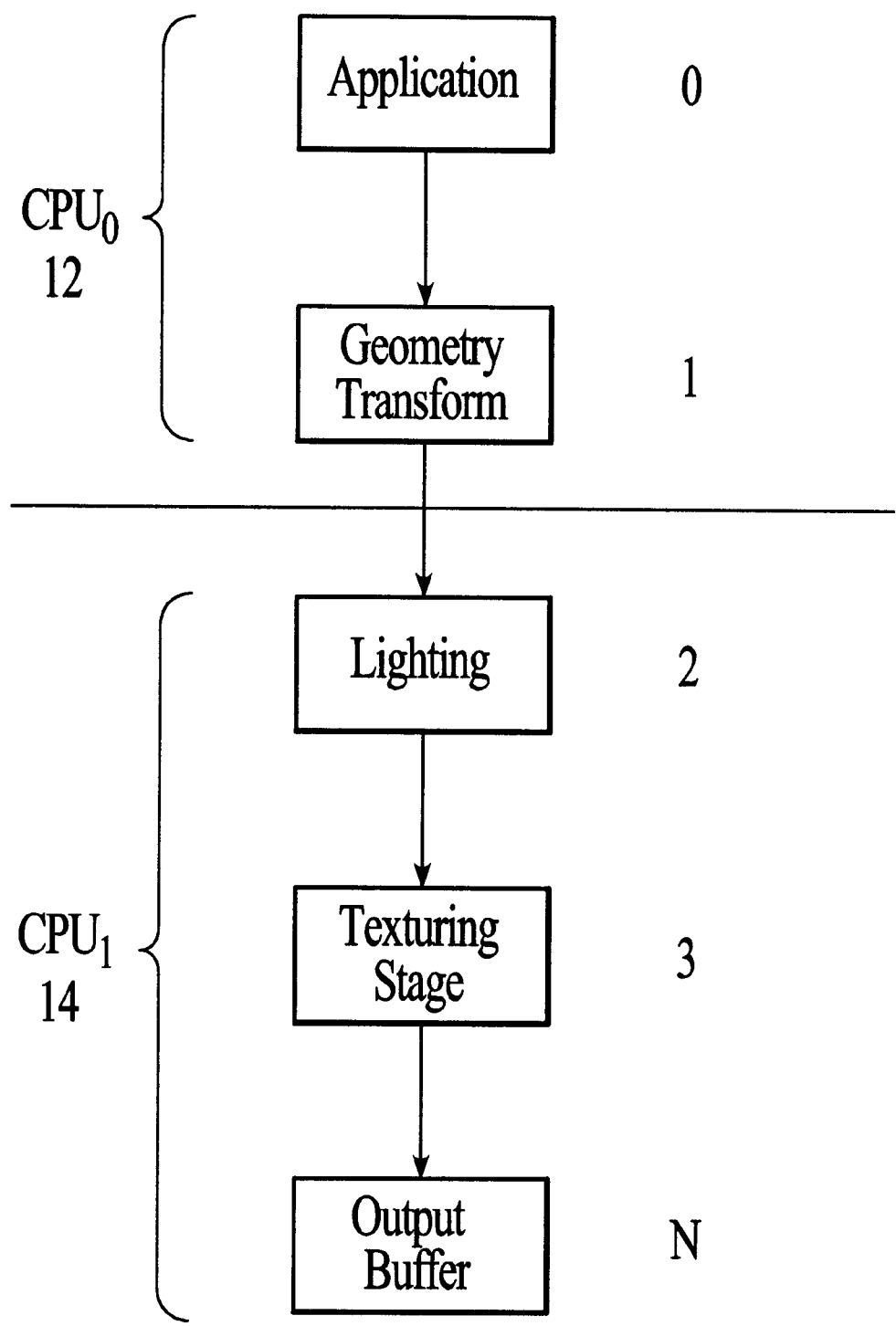
FIG. 2 shows a depiction of a system for executing a pipeline computation using the system for FIG. 1.

FIG. 2 shows a depiction of a system for executing a pipeline computation using the system of FIG. 1. This execution is typically performed utilizing a software program. The software program can be provided on a hard disk drive, floppy disk, CD-ROM or other computer readable medium. As is seen, CPUs 12 and 14 are assigned certain stages in the pipeline and execute the instructions appropriate to those stages and modifying some portion of the data. Accordingly, in this embodiment CPU 12 will execute the application (master thread 20) and the geometry based transform processing within its slave thread 16. Thereafter, that data will be transferred to CPU 14 which will then execute the remaining stages within its slave thread 18. As has been before mentioned, each of these CPUs includes a CPU cache. The data for the stages executed by the CPU is stored within the cache.

As has been before mentioned, the problem with this type of assignment system manifests itself when the CPUs transfer data between their caches. This transfer of data creates two problems. One, it significantly slows the operation of the graphics processor system because to insure that the communication between the CPUs occurs at the appropriate time, then the execution of at least one of the CPUs must be stalled until the other CPU becomes ready. This is called synchronization. This significantly slows the operation of the system. Two, the physical transfer of data between the CPUs requires the cooperation of both CPUs and is typically slow.

Accordingly, the present invention addresses these issues by providing a system and method which minimizes data motion and also minimizes synchronization issues associated therewith. To more particularly describe the features of the present invention in more detail refer now to the following discussion in conjunction with the accompanying figures.

Minimization of Data Motion

To minimize data motion, two criteria are met. First, for input data motion minimization each slave thread is locked to a particular CPU, and that CPU's cache includes substantially all the input data for the entire pipeline for that thread. Second, for output data motion minimization each slave thread is required to perform all operations on the input data before it is output to the hardware. This is also accomplished by providing that each slave thread execute the entire computational pipeline. Therefore minimal transfer of data between CPUs is required which improves the performance of the processing system.

Figure 3:
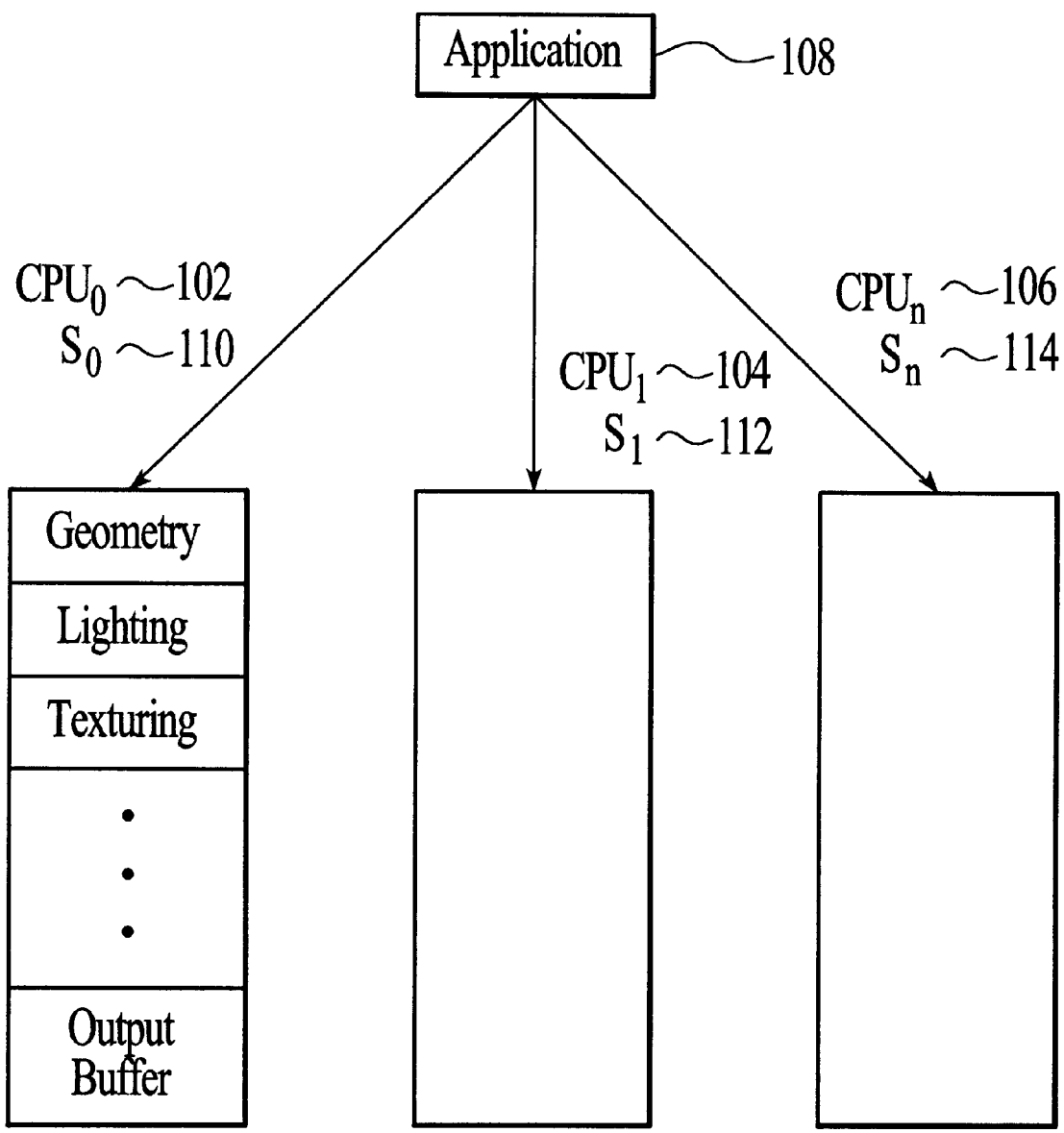
FIG. 3 is showing the operation of a system in accordance with the present invention.

To more particularly describe the features of the present invention, refer now to FIG. 3 which is a block diagram showing the operation of a system in accordance with the present invention. In this system, an application or master thread 108 moves between CPUs 102–106. In this system, each of the slave threads 110–114 executes a complete pipeline and in no place is output data transferred between CPUs 102–106. Each of the slave threads 110–114 output data directly to the output buffers 26 (FIG. 1). The master thread 108 moves or generates data for one slave thread in that thread's CPU cache then moves to the next sequential slave thread. In so doing, substantially all of the data executed by a particular slave thread is contained within the CPU cache where the slave thread resides.

Accordingly, for example, if master thread 108 is executing on CPU 102, it can generate some amount of data and then move to CPU 104 and generate data there while slave thread 110 begins executing on CPU 102. Accordingly, the master thread 108 will cause a slave thread to execute data in that thread's particular CPU. Further, when the master thread 108 is running on the CPU 102, then the slave thread 112 associated with that CPU 104 can execute its pipeline. Since this thread executes the entire computation corresponding to the input data there is no place that output data is transferred between CPUs. Therefore, all the data from each of the slave threads can then be written directly into the (hardware mechanism) for displaying the image. In a preferred embodiment, this "hardware mechanism" is simply a set of hardware addressable buffers in main memory. As has been before mentioned, this system significantly improves the performance of the processing system 100.

Synchronization

Figure 4:
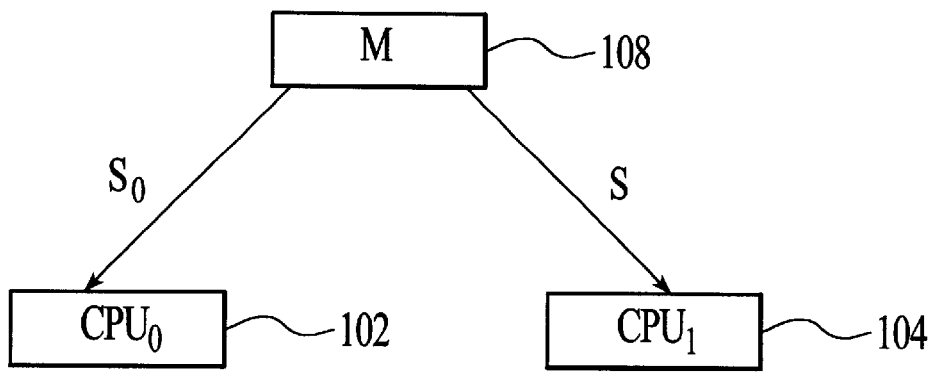
FIG. 4 is a block diagram showing the master thread moving from one CPU to another CPU.

The above described system in accordance with the present invention does provide synchronization issues that are different from the synchronization issues related to the system of FIG. 2. To illustrate this problem, refer now to FIG. 4. FIG. 4 is a block diagram showing the master thread 108 moving from CPU 102 to CPU 104. If the master thread 108 were infinitely fast, it could move from CPU 102 to CPU 104 and both of them could be receiving data to execute simultaneously. However, it is well known that at least some of the processing of data that is being provided CPU 104 is dependent upon the data that was provided CPU 102. To further illustrate this, refer now to FIG. 5.

Figure 5:
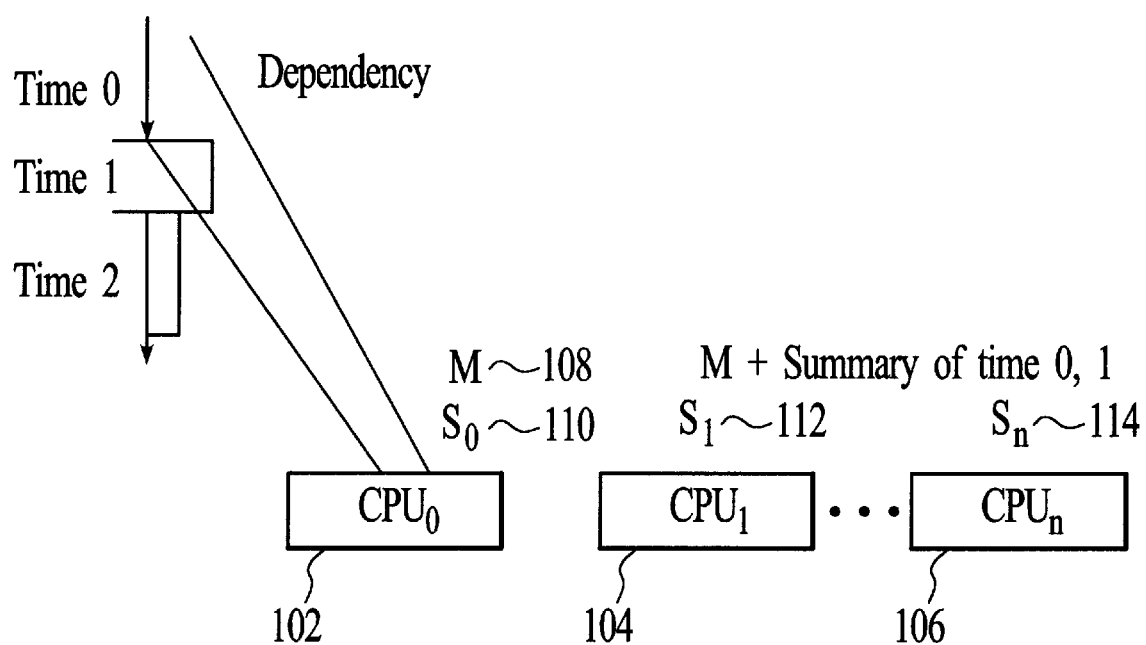
FIG. 5 shows a timeline of the execution of slave threads.

FIG. 5 shows a timeline of the execution of the slave threads 110 and 112 of CPU 102 and CPU 104. As is seen, as slave thread 110 processes data from time 0 to time 1, some portion of the system state of slave thread 110 at the end of time 0 must be known by slave thread 112 before slave thread 112 executes its pipeline. One way to ensure that all of the slave threads are synchronized is to provide the relevant system state information of the various slave threads to each other. For example, a straightforward implementation of such a synchronization mechanism would be to allow each of slave threads to read from and write to a single shared copy of the state information. However, the problem with such an implementation is all of the slave threads would have to synchronize before they could execute their particular instructions. This would add significant idle time to the overall system and affect the overall performance of the system. Moreover, the relevant data would be moving back and forth between the CPU caches.

Alternatively, each slave could process all input data scanning for changes to graphics context state. But this method guarantees that almost all input data would flow from CPU cache to CPU cache, thus erasing potential performance gains.

This problem is addressed by providing a summary of relevant changes to system state to each CPU, or slave.

Accordingly, in a preferred embodiment each slave thread executes just enough of an input stream to insure that the subsequent computation is provided an accurate indication of the system state.

Figure 6:
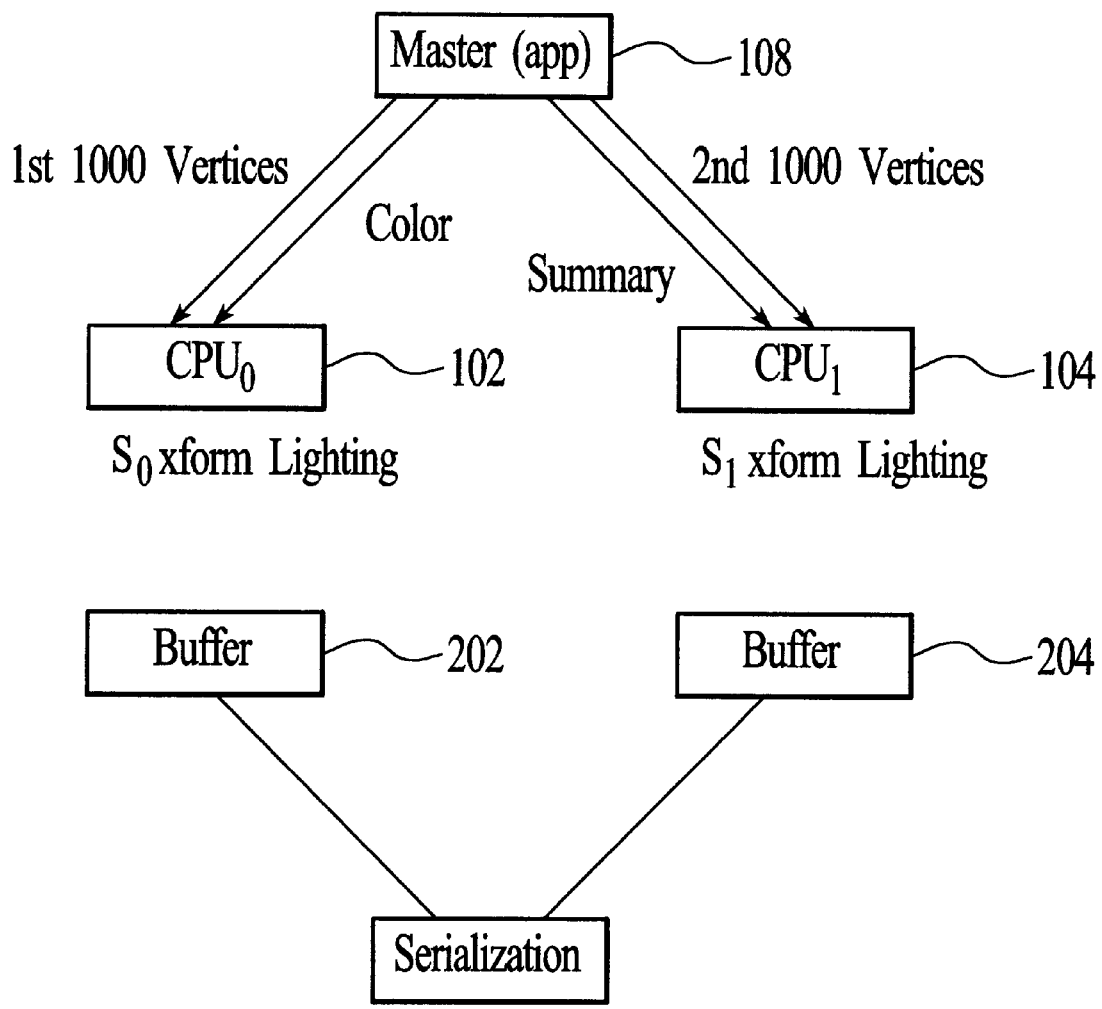
FIG. 6 shows a system for providing information to each of the slave threads so that they can properly execute their instructions while minimizing synchronization.

Referring now to FIG. 6, what is shown is a system for providing information to each of the slave threads so they can properly execute their instructions while minimizing synchronization.

As is seen, the master thread 108 may, for example, provide data regarding the first 1,000 vertices and color information to CPU 102. The master thread could then send a summary of the relevant changes to system state, in this case a single color, to CPU 104 and, for example, the next 1,000 vertices. In a preferred embodiment, each slave thread would receive and process just enough state changes to guarantee correct starting conditions. Also each slave thread 110 and 112 would have its own output buffer 202 and 204. In a preferred embodiment, the output buffers would be reordered to match the original ordering of the input.

Accordingly, a system and method in accordance with the present invention minimizes data motion and also minimizes synchronization associated therewith in a graphics processor system. Data motion is minimized by executing an entire pipeline within each slave thread and each slave thread is required to perform all operations on the data before it is output to the hardware. This feature enhances the performance of the graphics processor system. To address synchronization issues between the CPUs a summary of the relevant changes to the system state for a previous computation is provided to each CPU within the graphics processor system. While the maintenance and transmittal of this summary information requires time and cache resources, overall system performance is still greatly improved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for optimizing the performance of a graphics processor system, the graphics processor system including a plurality of processors and a master thread, each of the processors including a slave thread; the method comprising the steps of:
   (a) providing an entire graphics pipeline within each of the slave threads; and
   (b) causing the master thread to move between the processors to cause each processor to execute its graphics pipeline, wherein the transfer of data between processors is minimized.

2. The method of claim 1 in which each of the processors include a cache.

3. The method of claim 2 in which each cache includes a substantial portion of the data for the graphics pipeline from its slave thread.

4. The method of claim 3 wherein only an amount of data necessary to establish correct starting conditions for a processor is transferred between processors.

5. The method of claim 4 which further comprises the step of (c) providing an output buffer for each slave thread.

6. The method of claim 5 wherein each slave thread has independent access to the hardware.

7. The method of claim 5 in which the output buffer's output data can be deposited for later use by the hardware.

8. The method of claim 5 wherein each output buffer would be reordered to match the original ordering of the input data.

9. A method for optimizing the performance of a graphics processor system, the graphics processor system including a plurality of processors and a master thread, each of the processors including a slave thread; the method comprising the steps of:
   (a) providing an entire graphics pipeline within each of the slave threads;
   (b) causing the master thread to move sequentially between the processors to cause each processor to execute its graphics pipeline;
   (c) providing a summary of a previous processor state to a subsequent processor, wherein synchronization is minimized.

10. The method of claim 9 wherein each of the processors include a cache.

11. The method of claim 10, in which each cache includes a substantial portion of the data for the graphics pipeline from its slave thread.

12. The method of claim 10 wherein each slave thread has independent access to the hardware output buffer.

13. The method of claim 10 in which the output buffer's output data can be deposited for later use by the hardware.

14. The method of claim 9 wherein only an amount of data necessary to establish correct starting conditions for a processor is transferred between processors.

15. The method of claim 9 which further comprises the step of (d) of providing an output buffer for each slave thread.

16. The method of claim 9 wherein each output buffer would be reordered to match the original ordering of the input data.

17. A computer readable medium containing program instructions for optimizing the performance of a graphics processor system, the graphics processor system including a plurality of processors and a master thread, each of the processors including a slave thread; the program instructions for:
   (a) providing an entire graphics pipeline within each of the slave threads; and
   (b) causing the master thread to move between the processors to cause each processor to execute its graphics pipeline, wherein the transfer of data between processors is minimized.

18. A computer readable medium containing program instructions for optimizing the performance of a graphics system, the graphics processor system including a plurality of processors and a master thread, each of the processors including a slave thread; the program instructions for:
   (a) providing an entire graphics pipeline within each of the slave threads;
   (b) causing the master thread to move sequentially between the processors to cause each processor to execute its graphics pipeline;
   (c) providing a summary of a previous processor state to a subsequent processor, wherein synchronization is minimized.

19. A method for optimizing the computation of a multiprocessor system including a master thread, each of the processors within the multiprocessor system including a slave thread; the method comprising the steps of:
   (a) providing an entire pipeline within each of the slave threads; and
   (b) causing the master thread to move between the processors to cause each processor to execute its pipeline, wherein the transfer of data between processors is minimized.

* * * * *